United States Patent
Yeh et al.

(10) Patent No.: US 6,778,175 B2
(45) Date of Patent: Aug. 17, 2004

(54) METHOD OF ARBITRATION OF MEMORY REQUEST FOR COMPUTER GRAPHICS SYSTEM

(75) Inventors: Kuo-Wei Yeh, Miao Li Hsien (TW); Yuan-Chin Liu, Taichung (TW)

(73) Assignee: XGI Technology Inc., Hsinchu (TW)

( * ) Notice: Subject to any disclaimer, the term of this patent is extended or adjusted under 35 U.S.C. 154(b) by 178 days.

(21) Appl. No.: 10/067,386

(22) Filed: Feb. 5, 2002

(65) Prior Publication Data

US 2003/0146916 A1 Aug. 7, 2003

(51) Int. Cl.$^7$ .............................................. G06F 13/18
(52) U.S. Cl. ..................... 345/535; 345/531; 345/534
(58) Field of Search ................................ 345/535, 531, 345/534

(56) References Cited

U.S. PATENT DOCUMENTS

| | | | |
|---|---|---|---|
| 5,852,451 A | * 12/1998 | Cox et al. | .................. 345/570 |
| 6,396,503 B1 | * 5/2002 | Goss et al. | ................. 345/582 |
| 6,438,670 B1 | * 8/2002 | McClannahan | ............. 711/167 |

* cited by examiner

Primary Examiner—Matthew C. Bella
Assistant Examiner—Allen E. Quillen
(74) Attorney, Agent, or Firm—Raymond Y. Chan; David and Raymond Patent Group

(57) ABSTRACT

The present invention, a method of the arbitration of memory request for a computer graphics system, consecutively services the requests having the same type in the same period, thereby increasing the chance of page-hit. In this arbitration method, the length of a fixed period is defined by the 3-D graphics engine in accordance with the amount of memory cycles or the amount of the requests, and is used for controlling the amount of the requests of each type. The length of the period can be the cycles of servicing a block comprising a tile or several tiles. Alternatively, instead of defining a fixed length of the period, the 3-D graphics engine can choose another arbitration method of the present invention. Another arbitration method of the present invention is to mark a message at the end of the drawing block, so that the memory control can decide to rotate the service order to the next type of requests according to the block-end message received. The present invention groups and services the memory requests according to the property of 3-D pipelining. Therefore, the page-miss and read-write turnaround penalties can be reduced, so that data can be accessed more efficiently.

14 Claims, 5 Drawing Sheets

METHOD OF ARBITRATION OF MEMORY REQUEST FOR COMPUTER GRAPHICS SYSTEM

FIELD OF THE INVENTION

The present invention relates to a memory controller of computer graphics system. More particularly, the present invention relates to a method of the arbitration of memory requests for a computer graphics system.

BACKGROUND OF THE INVENTION

Since the speed of processors has been steadily increasing, therefore, the need for a more efficient memory controller to provide a faster memory access becomes an important subject. In a computer systems design, the delay of retrieving data from memory may result in a low performance. Thus, the latency of memory becomes a factor of bottleneck for limiting the improvement of performance.

FIG. 1 illustrates a block diagram showing the skeleton of typical 3-dimention (3-D) graphics engine. Referring to FIG. 1, a typical 3-D engine can be divided into several stages in pipeline: transform 14, lighting 16, setup 18, scan converter 20, color calculator 22 and texture-processing unit 24, etc. The engine in each stage has its own graphic function. The engines of the stages of transform 14 and lighting 16 are used for geometric and color calculations, and the engine of the stage of setup 18 for initializing the primitive. Besides, the scan converter 20 can be used for deriving the pixel coordinate, and the color calculator 22 for generating smooth drawing color. The texture-processing unit 24 can be used for processing drawing texture. Further, the alpha blending 30 can be used for generating transparent and translucent effect. The depths test 26 can be used for removing pixel-based hidden surface, and the display controller 32 for accurately displaying images on the monitor 36, and so on.

The 3-D graphics engine receives and executes the commands stored in the command queue 12, and the memory controller 28 accesses the data in the graphics memory via the memory bus 40. The command queue 12 is a first-in-first-out (FIFO) unit, and can receive and store command data from the controller 10 via the system bus 38. A 3-D graphics engine in the accelerator reads different types of data from the display memory 34, and writes different types of data to the display memory in order to perform drafting. For instance, the texture-processing unit 24 reads texture data for performing a texture mapping, and the depths test 26 accesses the depth information (Z-value) from Z buffer for hidden surface removal, and the alpha blending 30 reads the color value for color operating. FIG. 2 illustrates a diagram of the contents of the display memory. Referring to FIG. 2, a display memory 50 contains a frame buffer 52 for storing pixel color values, a Z buffer 54 for holding depths information, and a texture buffer 56 for storing texture data. Also, the display memory 50 can further include other buffers such as an alpha buffer and a stencil buffer, etc.

All the graphics drawing operations involve in accessing many different types of display memory. Obviously, the display memory is easily to be congested if there are huge amount of accesses in different buffers during the rendering process. Hence, for increasing the performance of the 3-D pipeline, many request queues, such as color request queues, texture request queues, Z buffer request queues and so on, are used to prevent some stages from stalling and waiting required data. The memory controller 28 shown in FIG. 1 is used to manage data accesses. The conventional method of the arbitration of a memory controller, such as a rotational priority scheme, is to assign fixed priorities to different types of requests, and then to service requests by their priorities. For instance, if there are three types of requests in the computer graphics system, and the types are the first type, the second type, and the third type, wherein the three types may respectively belong to the operations of read, write or the data of depth, color and texture data, etc., then the memory controller each time services a request of different type according to the priorities of the three types. For example, a request of the first type is first serviced, and then a request of the second type is serviced, and thereafter, a request of the third type is serviced, whereby all the requests are serviced.

Since the data of different types are stored in different pages, a convention arbitration method using rotational priority scheme often incurs the page-miss while accessing two consecutive data, and further reduces the bandwidth of memory due to read-write turnaround penalties. Therefore, the performance of accessing memory is reduced, and an inefficient pipelining is caused.

SUMMARY OF THE INVENTION

There are different types of requests of accessing data, and the conventional rotational priority scheme used in the memory controller may reduce the chances of accessing consecutive data of the display memory and increase the delays of accessing memory. Hence, the aspect of the present invention is to provide a method of arbitration of memory request for the computer graphics system, thereby determining the service order of requests of the display memory.

In view of the aforementioned aspects, the present invention, the method of the arbitration of memory requests for a computer graphics system, services a plurality of requests having a plurality of types. The present invention includes: (a) performing a defining step to determine that, only the requests of a first type in a first block are serviced in a first period; only the requests of a second type in the first block are serviced in a second period; and so on, only the requests of a Nth type in the first block are serviced in a Nth period; (b) performing the first period, to service the requests of a first type in the first block; (c) performing the second period, to service the requests of the second type in the first block; (d) and so on, performing the Nth period until all these requests in the first block have been serviced. The present invention further comprises the steps of repeating the above-mentioned steps (b), (c) and (d), to service the requests in a second block. The N value, standing for the number of the types, can be any positive integer, and be decided by the graphics system or operators.

In the method of the arbitration of memory request for a computer graphics system of the present invention, the aforementioned N types can be the functional parameters selected from the group consisting of Z-read, Z-write, texture-read, texture-write, color-read, and color-write, wherein the functional parameters are used in a graphics system. The above-mentioned block can comprise a tile or a plurality of tiles. The present invention further provides two preferred embodiments according to the aforementioned method of arbitration, to obtain more streamlined pipelining.

The present invention groups the requests and provides services thereto according to the property of the 3-D pipelining. Thus, based on the present invention, the method of the arbitration increases the chances of accessing consecutive memory data, and has the advantages of reducing memory page-miss and read-write turnaround penalties. Therefore, the useful memory bandwidth is increased so that the data transformation between the display memory and the request initiator is speeded up.

BRIEF DESCRIPTION OF THE DRAWINGS

The above features of the present invention will be more clearly understood from consideration of the following descriptions in connection with accompanying drawings in which.

DETAILED DESCRIPTION OF THE PREFERRED EMBODIMENT

Figure 1:
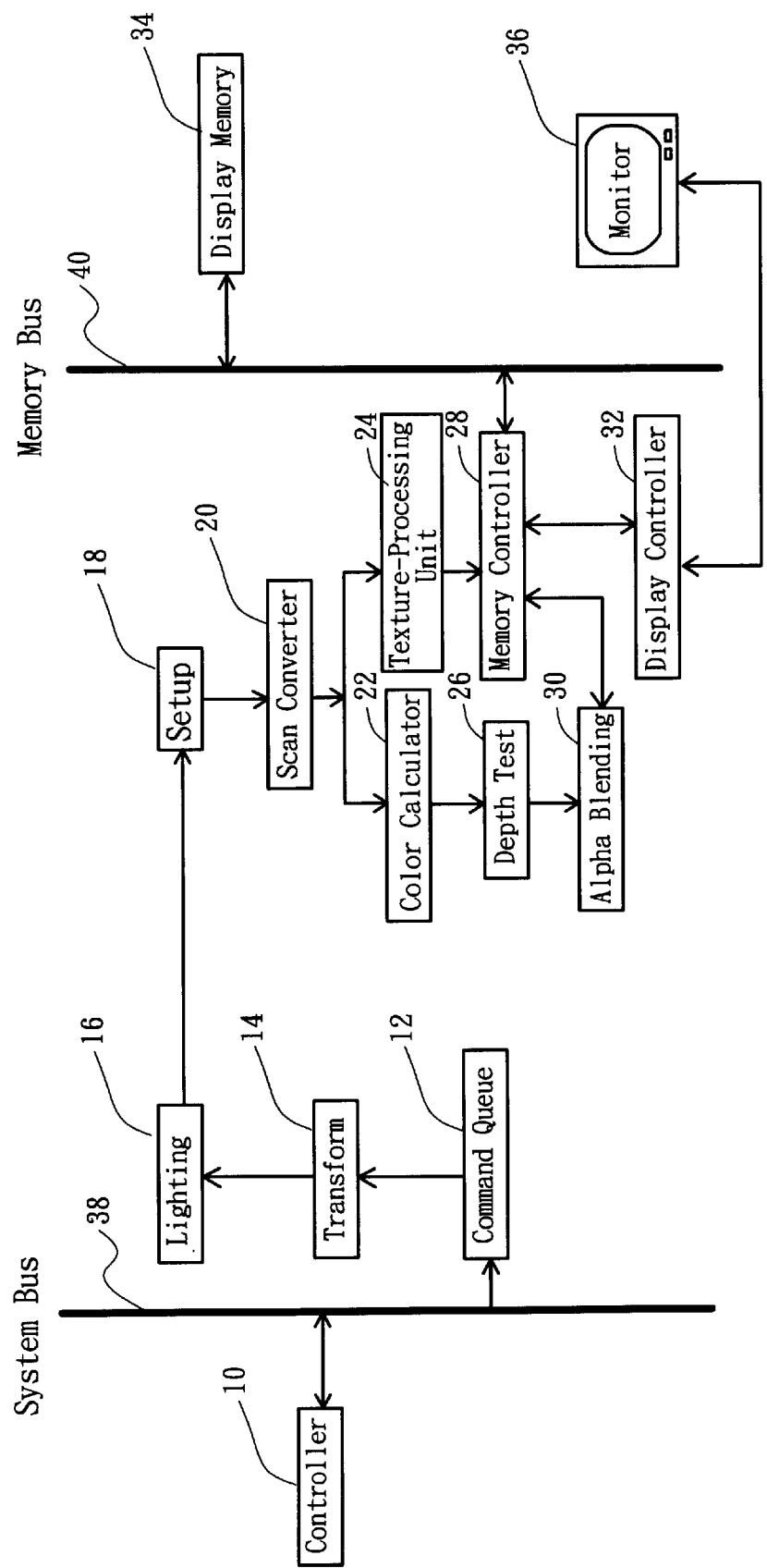
FIG. 1 illustrates a block diagram showing the skeleton of typical 3-dimention (3-D) graphics engine.
Figure 2:
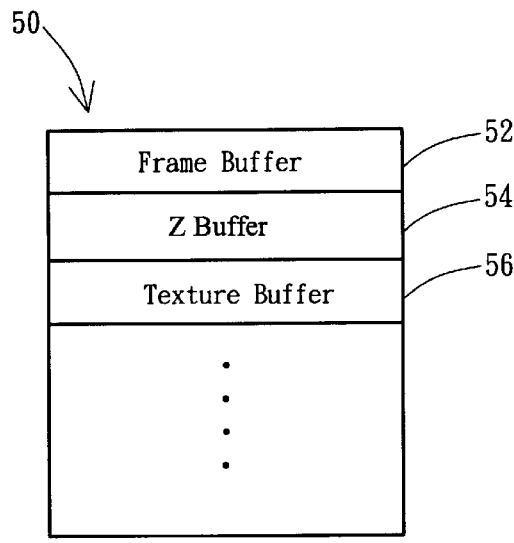
FIG. 2 illustrates a schematic diagram showing the contents of the display memory.
Figure 3:
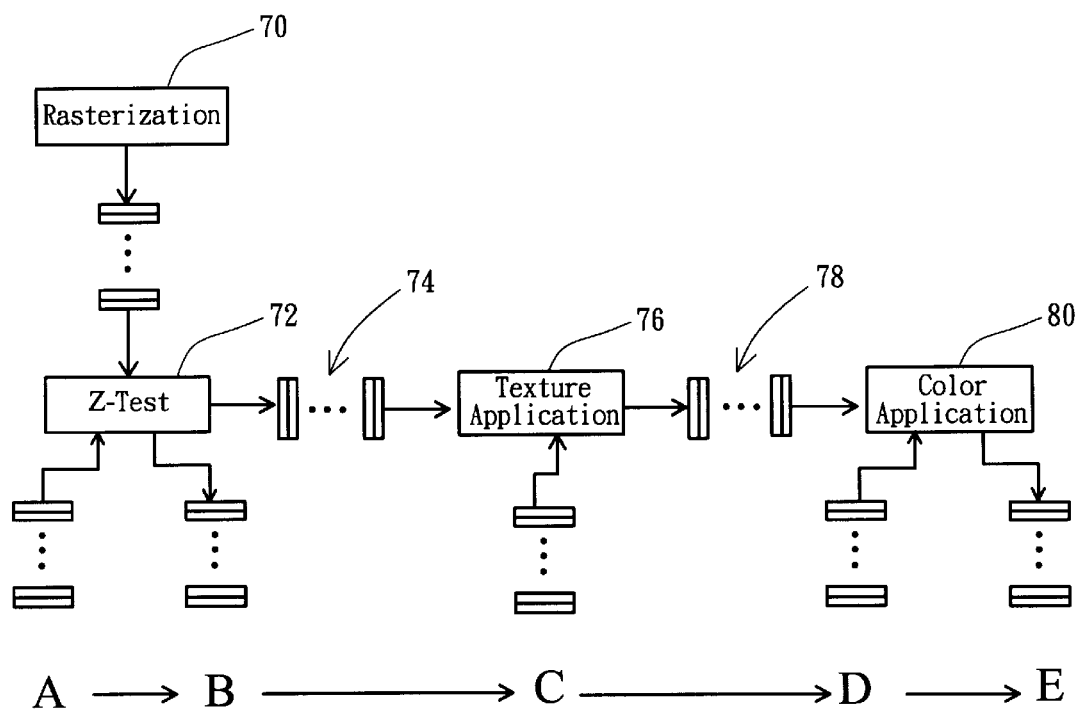
FIG. 3 illustrates a schematic diagram showing the typical data flow in 3-D pipeline.

FIG. 3 illustrates a schematic diagram showing the typical data flow in 3-D pipeline. To begin with the step of the rasterization 70, the stages such as those of Z-test 72, texture application 76 and color application 80 are preformed in turn, to perform a 3-D drafting. Other stages such as those of the alpha test or stencil test can be added into the pipeline, so as to make the 3-D graphics system more complete.

Referring to FIG. 3, the modem hardware of 3-D accelerator usually supports Z-buffer for performing hidden surface removal at pixel level. In the stage of Z-test, the algorithm of Z-buffer reads Z-value of each pixel, and compares it to the Z values stored in the Z-buffer. If the new Z-value is closer to viewers than the old one is, then the old pixel is replaced by the new pixel, and the new Z-value is stored in the Z-buffer as a reference value for the next pixel. The memory bandwidth is very easily to be consumed by the steps of read/write out/in the Z-buffer if the Z-test is enabled in a 3-D graphics system.

Next, in the stage of texture application 76, one of the very important techniques for realizing computer 3-D images is texture mapping. Typically, a piece of texture map is a two-dimensional array of color values, and each individual color value is named as a texel. Each texel has a unique address in the texture map, and can be shown as a determinant with the column and row indices. The 3-D application can assign texture coordinates to any vertex of any primitive. Thus, when the computer graphics system renders a primitive, texture coordinates are calculated, and the corresponding texels for each pixel of the primitive are accessed from texture memory. To obtain higher image quality, large amounts of memory bandwidth are required to access texels data from texture memory, if the function of the texture application is enabled in the 3-D graphics system.

Thereafter, in the step of color application 80, the step such as alpha blending is used as the rendering technique. In the stage of the alpha blending, the source color is multiplied by the alpha value, and the destination color is multiplied by the inversed alpha value. Two color values are summed up and divided by the maximum result of alpha value so as to generate the output pixel value. Hence, if the function of the alpha blending is enabled in the 3-D graphics system, the read and write requests of the frame buffer are generated. On the other hand, if the reading data buffer is empty, the stage where the buffer is located may stalls. For instance, if the read buffer of the texture data is empty, the stage of the texture application will stall accordingly. In a worse case, both stages of the Z-test 72 and color application 80 will stall because the pixel FIFO_1 74 is full, causing the pixel FIFO_2 78 to be empty.

The conventional method of arbitration first services a request A of Z-read, and then in turn services a request B of Z-write, a request C of texture-read, a request D of color-read, and a request E of color-write. The services of the requests A, B, C, D and E are repeated in turn until all the requests are serviced. The services between each two requests having different types actually cause the disadvantages of page-miss and read-write turnaround.

Therefore, the present invention provides a method of the arbitration of memory request for a computer graphics system, wherein memory requests of the same type in each pre-determined period are continuously serviced. In the 3-D pipeline technique utilized by the present invention, the requests having different types are serviced proportionally to avoid the stalling of the stages in pipeline. Meanwhile, to prevent the stages in pipeline from stalling, each data reading buffer must maintain sufficient amounts of data provided to the mutual stages in pipeline while the memory access right is assigned to others.

Figure 4:
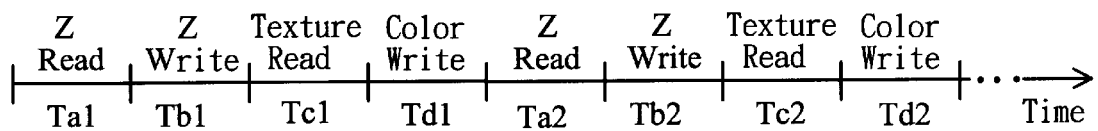
FIG. 4 illustrates a schematic diagram showing one embodiment using the method of arbitration of memory request for the computer graphics system, according to the present invention.

FIG. 4 illustrates a diagram showing one embodiment of the method of arbitration of memory request for the computer graphics system, according to the present invention. In this embodiment, it is assumed that the 3-D engine is a two-pixel pipeline and the memory bandwidth is 128 bits per cycle. In the 16-bpp mode, the stages of color, Z, and texture all are 16 bits per pixel or per texel. The DRAM (dynamic random access memory) can service the data request of 8 pixels or texels per cycle. Each stage of the 3-D engine consumes and generates 2 pixel data per cycle, i.e. Z, texel or color. Besides, in this embodiment, the required memory bandwidth of the 3-D engine is equal to that provided by the DRAM. In this embodiment of the present invention, 4 request types are required, which are Z-read, Z-write, texture-read, and color-write. This embodiment ignores the alpha blending, so that there is no request of color-read. Referring to FIG. 4, in the periods of Ta1, Ta2, . . . , etc., only the requests of Z-read are serviced by the memory controller. In the periods of Tb1, Tb2, . . . , etc., only the requests of Z-write are serviced by the memory controller. In the periods of Tc1, Tc2, . . . , etc., only the requests of texture-read are serviced by the memory controller. And, in the periods of Td1, Td2, . . . , etc., only the requests of color-write are serviced by the memory controller.

Hence, viewing from the time axis, the sequence of the requests serviced by memory controller is Z-read, Z-write, texture-read, color-write, Z-read, Z-write, texture-read, color-write, and so on. The memory controller, using the method of arbitration of memory request for the computer graphics system of the present invention, can service the memory requests of the same type consecutively in each period. Thus, the probabilities of the page-hit are increased, and the page-miss and read-write turnaround penalties can be reduced.

The lengths of the aforementioned periods of the present invention, Ta1, Tb1, Tc1, Td1, Ta2, Tb2, Tc2, Td2, . . . , etc., are determined according to the design of 3-D rendering engine. The more cycles in each period, the more units of the read data FIFO, and request FIFO is required. For example, if one period contains 8 cycles, there must be at least 8 units in read data FIFO and in requests FIFO, for receiving data from memory and gathering requests respectively. The length of each period can be defined as according to the amounts of memory cycles or the amounts of requests. If the 3-D engine employs a tile-based rendering method, in which a primitive is rendered tile by tile, and each period length can be defined as the required cycles of servicing the requests having same type in one tile. According to different 3-D graphics systems, the aforementioned tile can consist of a 2*2, 2*4, 4*2, 4*4, 4*8, 8*4 or other pixel block, and the present invention is not limited thereto. Further, the period length can be defined as the required cycles of servicing the requests having same type in one block, including at least one tile, and the area of the block is also decided by the 3-D graphics system.

Figure 5:
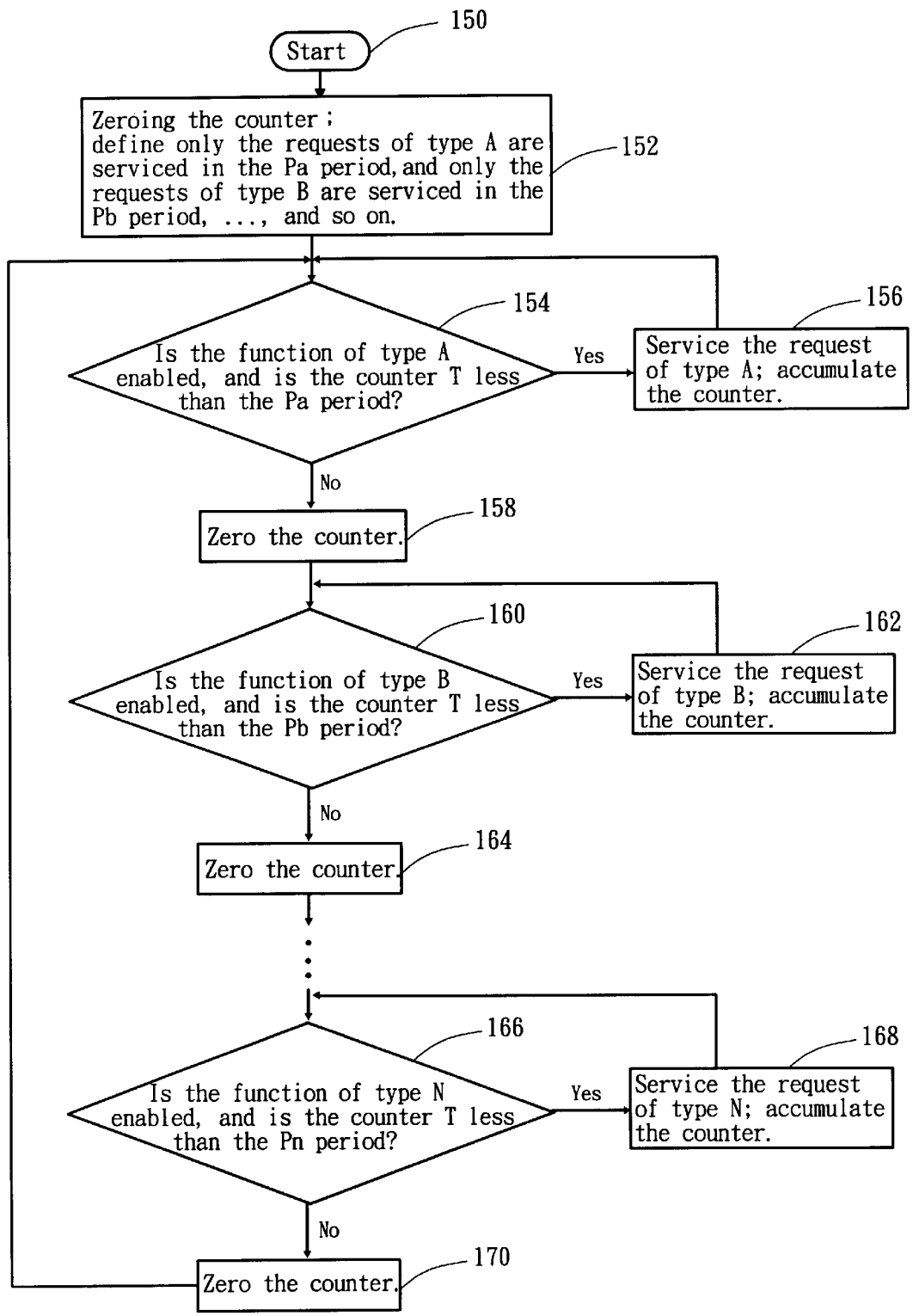
FIG. 5 illustrates a flow chart showing one embodiment using the method of arbitration of memory request for the computer graphics system, according to the present invention.

The present invention is described with several preferred embodiments. FIG. 5 illustrates a flow chart showing one embodiment using the method of the arbitration of memory request for a computer graphics system, according to the present invention. Referring to FIG. 5, to begin with the step 150, the proceeding step 152 is performed. In the proceeding step 152, the counter in the system is zeroed, and it is defined that only the requests of type A are serviced in the Pa period, and only the requests of type B are serviced in the Pb period, and so on. Next, the check step 154 is performed to check if the function of type A is enabled in the 3-D graphics system and the time T of counter is less than period Pa. If the function of type A is enabled in the 3-D graphics system and the time T of counter is less than period Pa, then the proceeding step 156 is performed to service a request of type A and to accumulate the counter after a request of type A is serviced. Then, it comes back to the check step 154 to repeat the check of the counter. In the check step 154, the function of type A must be checked because the function of type A is not supported in some 3-D graphics system. If the function of type A is not supported, the requests of type A are not classified, read or written. In the check step 154, the length of period Pa is defined first, and compared with the counter time T, which is accumulated after servicing a request of the type A. According to the result, it is known that if the services of the predetermined amount of requests of type A are completed.

In the check step 154, if the function of type A is not enabled in 3-D graphics system, or the time T of the counter is more than period Pa, it is considered that the predetermined amounts of the requests of the type A are serviced completely. Then, the proceeding step 158 is performed to zero the counter. Next, the check step 160 is performed to check if the function of type B is enabled in 3-D graphics system and the time T of the counter is less than period Pb. In the check step 160, if the function of type B is enabled in 3-D graphics system and the time T of the counter is less than period Pb, the proceeding step 162 is performed to service a request of type B and to accumulate the counter after a request of the type B is serviced. Then, it comes back to the check step 160 to repeat the check of the counter. Until the time T of the counter is more than period Pb, it is shown that the services of the predetermined amounts of the requests of type B are completed. The proceeding step 164 is performed to zero the counter.

And so on, the check step 166 is performed to check if the function of type N is enabled in the 3-D graphics system and the time T of the counter is less than period Pn, wherein the type N is the last request type in one serviced turn. In the check step 166, if the function of the type N is enabled in the 3-D graphics system and the time T of the counter is less than period Pn, the proceeding step 168 is performed to service a request of type N and to accumulate the counter after a request of the type N is serviced. Then, it comes back to perform the check step 166 for repeating the check of the counter. Until the time T of the counter is more than period Pn, it is shown that the services of the predetermined amounts of the requests of type N are completed. When all the types are serviced in a first turn, the check step 154, the check step 160, the check step 166 are repeated, in order to service the predetermined amounts of the requests of all types, type A, the type B, to type N, in a second turn. All the memory requests are serviced in the third turn, the fourth turn, and so on.

The embodiment of the present invention has the characteristics of the aforementioned method of the arbitration of memory requests of a computer graphics system. In the embodiment, the requests of the same type are serviced in a period while the type function is enabled, and it changes to service the next type while the predetermined period is completed. The chances of accessing consecutive data in the memory are increased because of the turns of the periods.

Figure 6:
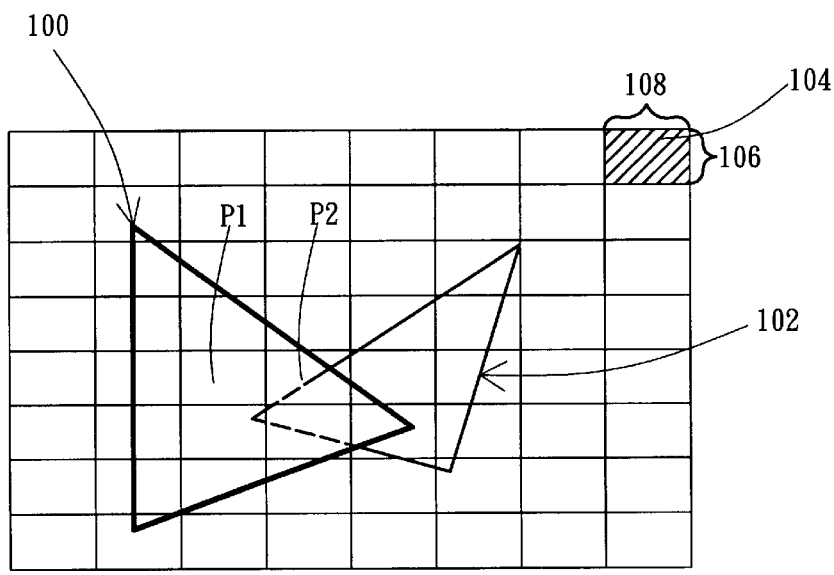
FIG. 6 illustrates a schematic diagram showing the computer display.

Otherwise, the amounts of data requirement of each type may be varied in one period, and the present invention provides another preferred embodiment for performing drawing action efficiently. FIG. 6 illustrates a diagram showing the computer display. It is assumed that a tile, the unit of the drawing action in 3-D graphics system, contains m pixels 108*n pixels 106. Referring to FIG. 6, the polygon 100 is in front of the polygon 102. That is to say, the polygon 100 is closer to viewers than polygon 102. When tile P1 is rendered, the request of the Z-read and Z-write type of all pixels are required to service, in order to perform the depths test and to update the Z-buffer respectively. However, when tile P2 is rendered, the requests of Z-read type of all pixels are serviced to check the Z values in the tile P2. But, because the polygon 102 is covered with polygon 100 in the tile P2, the pixels of the covered polygon 102 do not service the request of the Z-write type. It is shown that, in the tile P2, the requests of Z-read do not have the same amounts with the Z-write type, so as the request of other types between the tile P2 and the tile P1. Due to the difference of the amounts of the requests, the servicing periods are not fixed. The method of the aforementioned embodiment in the FIG. 5 is not used herein, which services a fixed period or a fixed amount. It may waste time so that it cannot service the requests efficiently. For this reason, the present invention defines a message in the block-end of the requests of each type for rotating the service order to the next type of the request. The block-end message can be marked by related pipeline stage of the 3-D graphics engines. The technique of marking steps is known by the person skilled in the art, so that it is not described in the present invention herein.

Figure 7:
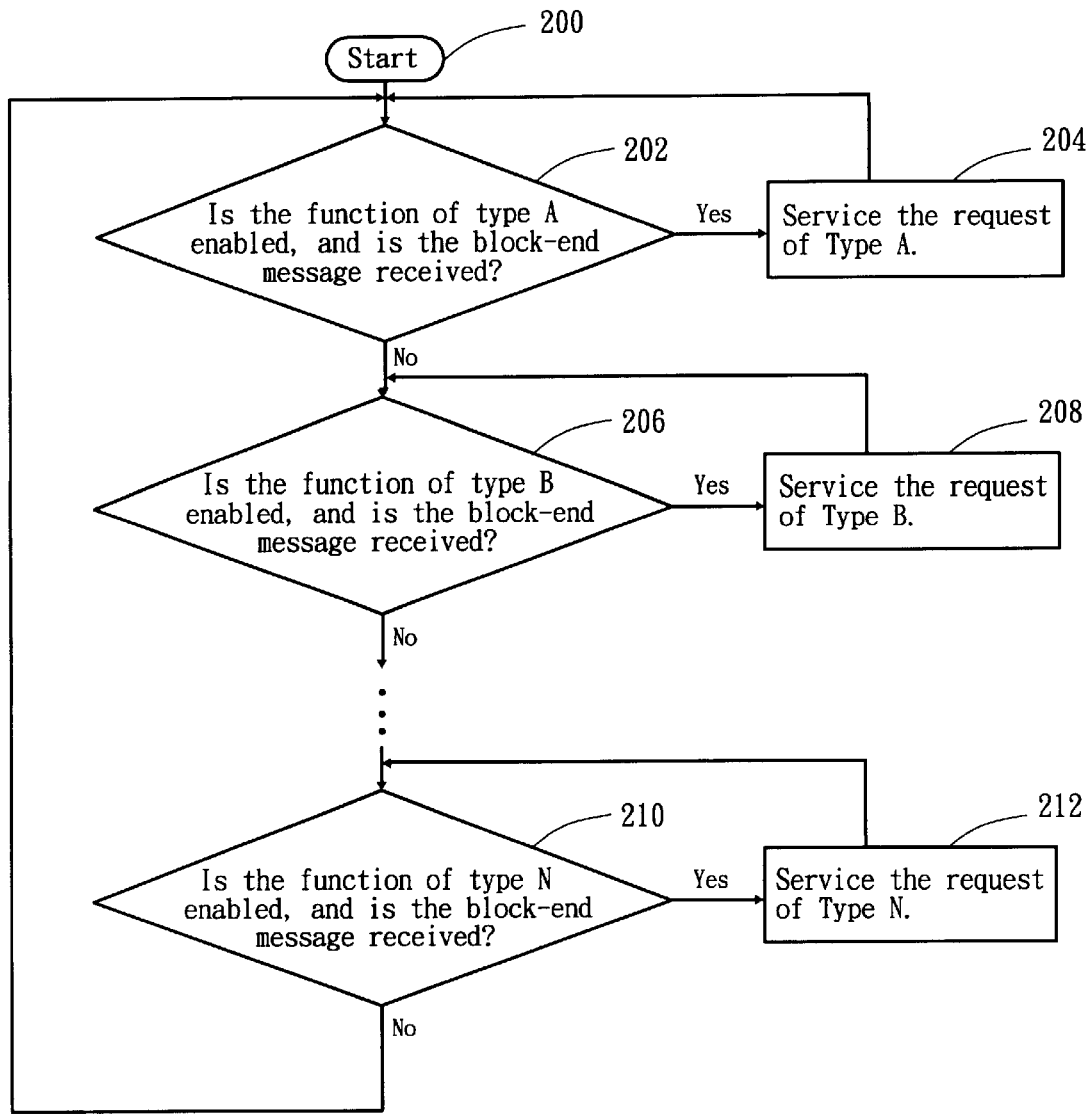
FIG. 7 illustrates a flow chart showing the other one embodiment using the method of arbitration of memory request for the computer graphics system, according to the present invention.

FIG. 7 illustrates a flow chart showing the other embodiment using the method of arbitration of memory request for the computer graphics system, according to the present invention. Referring to FIG. 7, to begin with the step 200, the check step 202 is performed to check if the function of type A is enabled in the 3-D graphics system and the block-end message is received. In the check step 202, if the function of type A is enabled in the 3-D graphics system and the block-end message is not received, the proceeding step 204 is performed to service a request of type A. Next, the check step 202 is performed to repeat the check and processing of the next request of type A. On the other hand, in the check step 202, if the block-end message is not received, it shows the all requests of type A in this block are serviced, and the next check step 206 is performed to check and process the requests of type B. And so on, the requests of all types in the same block are serviced. Further, the foregoing steps can be repeated to complete the services of all requests in the next block.

In the present invention, sufficient memory space is needed for using the method of the arbitration of memory requests for a computer graphics system, and for storing the requests data and serviced results. To achieve the efficiency, it can be support by the computer hardware. It is noted that, the varieties and amounts of types of the requests can be different due to the design of 3-D graphics system. The types can be selected from the parameters in the computer graphics system, like Z-read, Z-write, texture-read, texture-write, color-read, or color-write, and the present invention is not limited thereto. Besides, the service order of the types of the requests can be chosen randomly according to the design of 3-D graphics system.

The arbitration method of the present invention switches the arbiter of the memory from passive role to active role, thereby making the data flow of 3-D pipeline more streamlined. When the throughput is bound in memory access, using the arbitration method can fill the waste space of memory accesses to burst memory access and to increase utilization of the memory bandwidth. If the throughput is bound in 3-D engine, the arbitration method of the present invention increases the chances of accumulation of the same type of the request. Therefore, the page-miss and read-write turnaround penalties can be reduced to improve the delay of accessing memory.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method of the arbitration of memory request for a computer graphics system, the method being used for servicing a plurality of requests having a plurality of types including a first type, and a second type to a Nth type, the method comprises:

(a) performing a defining step to determine a plurality of periods which are consecutive and corresponding to the types, and the periods are a first period, and a second period to a Nth period, wherein the requests of the first type in a first block are serviced in the first period; the requests of the second type in the first block are serviced in the second period; and similarly, the requests of the Nth type in the first block are serviced in the Nth period;

(b) performing the first period to service the requests of the first type in the first block;

(c) performing the second period after the first period is done, to service the requests of the second type in the first block; and (d) and performing steps similar to the step (c) until the Nth period is performed to service all the requests in the first block; wherein the first block comprises at least one first tile, and the first tile is composed of a first predetermined amount of pixels.

2. The method of arbitration of memory request for the computer graphics system of claim 1, wherein the method further comprises repeating the steps (b), (c) and (d) to complete the services of the requests in a second block; wherein the second block comprises at least one second tile, and the second tile is composed of a second predetermined amount of pixels.

3. The method of arbitration of memory request for the computer graphics system of claim 1, wherein the types are selected from a group consisting of Z-read, Z-write, texture-read, texture-write, color-read, and color-write.

4. The method of arbitration of memory request for the computer graphics system of claim 2, wherein an area of the first tile and an area of the second tile are defined by the computer graphics system according to amounts of cycles and the requests of the memory.

5. A method of arbitration of memory request for a computer graphics system, the method being used for servicing a plurality of requests having a plurality of types including a first type and a second type to a Nth type, the method comprising:

(a) zeroing a counter;

(b) performing a first defining step to define the length of a plurality of periods in order to limit an amount of the requests serviced in each of the periods, wherein the periods are a first period, and a second period to a Nth period which are consecutive and corresponding to the types, wherein;

(c) performing a second defining step to define that the requests of the first type are serviced in the first period, and the requests of the second type are serviced in the second period, and similarly, the requests of the Nth type are serviced in the Nth period;

(d) performing a check step to check if a function of the first type is enabled and the time of the counter is less than the first period;

(e) if the answer of the step (d) is yes, performing a first proceeding step, the first proceeding step comprising: servicing a first request, wherein the first request is one of the requests of the first type;
    accumulating the counter; and
    repeating the step (d);

(f) if the answer of the step (d) is no, zeroing the counter and performing the step (g);

(g) performing a second check step to check if a function of the second type is enabled and the time of the counter is less than the second period;

(h) if the answer of the step (g) is yes, performing a second proceeding step, the second proceeding step comprising:
    servicing a second request, wherein the second request is one of the requests of the second type;
    accumulating the counter; and
    repeating the step (g);

(i) if the answer of the step (g) is no, zeroing the counter and performing step (j);

(j) and similarly, performing a Nth check step to check if a function of the Nth type is enabled and the time of the counter is less than the Nth period; and (k) if the answer of the step (j) is yes, performing a Nth proceeding step, the Nth proceeding step comprising:
    servicing a Nth request, wherein the Nth request is one of the requests of the N type;
    accumulating the counter; and
    repeating the step (j).

6. The method of arbitration of memory request for the computer graphics system of claim 5, the method further comprising repeating the steps (d), (e), (f), (g), (h), (i), (j) and (k) to complete the services of the requests in the computer graphics system.

7. The method of arbitration of memory request for the computer graphics system of claim 5, wherein the types are selected from a group consisting of Z-read, Z-write, texture-read, texture-write, color-read, and color-write.

8. The method of arbitration of memory request for the computer graphics system of claim wherein the amount has the same quantity of a plurality of pixels in a block, wherein the block comprises at least one tile, and the tile is composed of a first predetermined amount of pixels.

9. The method of arbitration of memory request for the computer graphics system of claim 8, wherein an area of the tile is defined by the computer graphics system according to amounts of cycles and the requests of the memory.

10. A method of arbitration of memory request for a computer graphics system the method being used for servicing a plurality of requests having a plurality of types including a first type, a second type, to a Nth type, the method comprising:

(a) performing a first check step to check if a function of the first type is enabled in a first block and a first block-end message of the first type is not received;

(b) if the answer of the step (a) is yes, performing a first proceeding step, the first proceeding step comprising:
servicing a first request, wherein the first request is one of the requests of the first type; and
repeating the step (a);

(c) if the answer of the step (a) is no, performing the step (d);

(d) performing a second check step to check if a function of the second type is enabled in the first block and a second block-end message of the second type is not received;

(e) if the answer of the step (d) is yes, performing a second proceeding step, the second proceeding step comprising:
servicing a second request, wherein the second request is one of the requests of the second type; and
repeating the step (d);

(f) if the answer of the step (d) is no, performing the step (g);

(g) and similarly, performing a Nth check step to check if a function of the Nth type is enabled in the first block and a Nth block-end message of the Nth type is not received;

(h) if the answer of the step (g) is yes, performing a Nth proceeding step, the Nth proceeding step comprising:
servicing a Nth request, wherein the Nth request is one of the requests of the Nth type; and
repeating the step (g); wherein the first block comprises at least one first tile, and the first tile is composed of a first predetermined amount of pixels.

11. The method of arbitration of memory request for the computer graphics system of claim 10, the method further comprising repeating the steps (a), (b), (c), (d), (e), (f), (g) and (h) to service all the requests in a second block, wherein the second block comprises at least one second tile, and the second tile is composed of a second predetermined amount of pixels.

12. The method of arbitration of memory request for the computer graphics system of claim 10, wherein the types are selected from a group consisting of Z-read, Z-write, texture-read, texture-write, color-read, and color-write.

13. The method of arbitration of memory request for the computer graphics system of claim 12, wherein an area of the first tile and the second title are defined by the computer graphics system according to amounts of cycles and the requests of the memory.

14. The method of arbitration of memory request for the computer graphics system of claim 10, wherein the first block-end message, the second block-end message, and similarly, the Nth block-end message are provided by a graphics engine.

* * * * *